United States Patent [19]
Foerster

[11] Patent Number: 5,685,171
[45] Date of Patent: Nov. 11, 1997

[54] METHOD OF SEPARATING ORGANIC VAPORS FROM GASEOUS MEDIA

[76] Inventor: Hans Foerster, Beimsstrasse 59, D-39110 Magdeburg, Germany

[21] Appl. No.: 610,224

[22] Filed: Mar. 4, 1996

[30]   Foreign Application Priority Data

Mar. 2, 1995 [DE] Germany .................. 195 07 198.0

[51] Int. Cl.$^6$ ........................................ F25J 3/00
[52] U.S. Cl. .......................... 62/633; 62/631; 62/632; 62/635
[58] Field of Search ........................ 62/617, 619, 623, 62/632, 633, 634, 635

[56]            References Cited

U.S. PATENT DOCUMENTS 4,575,387  3/1986  Larue et al. .................... 62/632
4,765,814  8/1988  Bauer et al. .................... 62/634
4,780,115  10/1988 Ranke ........................... 62/634 X
4,878,931  11/1989 Grant ............................ 62/632
5,450,728  9/1995  Vora et al. ..................... 62/613
5,481,881  1/1996  Buet et al. ..................... 62/633
5,540,057  7/1996  Cheng ........................... 62/632 X

*Primary Examiner*—Christopher Kilner
*Attorney, Agent, or Firm*—Karl Hormann

[57]            ABSTRACT

A method of separating from gaseous media, such as air or technical gases, organic vapors by substantially isothermally raising the pressure of the media and subjecting them to cooling in a cold scrubber receiving its operating low temperature from circulating first and second flows of refrigerants of moderate and significant refrigeration parameters and provided by resulting condensates.

19 Claims, 5 Drawing Sheets

METHOD OF SEPARATING ORGANIC VAPORS FROM GASEOUS MEDIA

BACKGROUND OF THE INVENTION

1. Field of the Invention

The invention in general relates to a method of separating organic vapors from gaseous media and, more particularly, to a method of separating, and reclaiming as valuable substances, organic vapors from air and technical gases.

The method may advantageously be applied for separating organic substances, such as hydrocarbons, which, as vapors, pollute air and gaseous flows. Such organic vapors occur, for example, in refineries, chemical plants, print shops and during filling operations of storage tanks for hydrocarbons at tank sites.

2. The Prior Art

German laid-open patent specification DE 4,303,670 discloses a process of compressing polluted air and providing the condensation capacity required for the liquefaction of the organic pollutants refrigeration generated by a turbine during the regenerative expansion of the air. While this is a simple process, it requires, in the case of highly polluted air, feeding back a large portion of the air to produce the required refrigeration. In other words, the quantity of the air or gaseous flow to be purified is insufficient to cover refrigeration requirements. The quantity of air required may be four times as large. This results in higher energy consumption, larger equipment, and increased installation costs. For this reason, that process is economically useful only in connection with low levels of pollution.

Where the substances in the air include higher proportions of light components, such components will flow in a vaporous state across the turbine and, following expansion, they precipitate as condensates. The consequence are damage to the expansion turbine and an undesirable increase in temperature after the expansion and commensurately lower air purification.

OBJECTS OF THE INVENTION

It is an object of the invention to provide a method of separating organic vapors from air and technical gases which may be operated in a single stage under higher pressure with a cold scrubber.

A more specific object of the invention is to provide an efficient method of recovering valuable organic substances in liquefied form.

Another object is to provide a method which allows removal of high levels of organic pollutants suspended in air at the warm end of a cold scrubber by equipment requiring small investment.

Yet another object of the invention is to provide a novel method of removing from gaseous substances pollutants containing significant proportions of light components, at the warm end of the cold scrubber.

It is also an object of the invention to provide an efficient method of removing from gaseous substances high levels of liquid or vaporous pollutants, at the warm end of the scrubber.

BRIEF SUMMARY OF THE INVENTION

In the accomplishment of these and other objects, the invention provides, in a cold air process, for attracting and compressing polluted air or other gaseous media with a suitable compressor, such as a screw compressor. Preferably, the compressor is of the type operating with water injection and, where necessary, under high pressure conditions. After compression, direct water cooling will take place, followed by further direct cooling and condensation by a circulating flow of the separated water-free recovered condensate. At moderate refrigeration parameters, the refrigeration required by the cold scrubber is provided by infusion of low temperature from a cold vapor refrigeration plant and by available residual low temperature of a cold air refrigeration component. At high refrigeration parameters the cold scrubber is cooled entirely by the low temperature from a cold air component. Light components will flow over the head or upper portion of the cold scrubber and are recovered or liquefied only at the expansion end of a cold air turbine.

At low production levels or small quantities of gaseous media, the turbine and the refrigeration generated by it, are replaced, in accordance with the invention, by the refrigeration provided by the evaporation of liquid nitrogen, and the gas is recovered, as required, under pressure.

Where high proportions of light components are present, the invention provides for removal of the refrigerated liquid produced from the lower end of an upper column, thus preventing renewed evaporation of the light components and their concentration in the lower column.

Infusing moderate parameter refrigeration into the lower column of a cold scrubber accommodates the need for increased refrigeration in this zone as a result of a quantitatively high proportion of separated condensates, and by an improved rinsing action it supports the movement of ice crystals into the lower warmer zones where the ice will melt again and precool the rising vapor phase.

The separation of the organic vapors may be influenced by the selected pressure. Higher pressures support the precipitation of organic components, and at the same time they provide cold air at lower temperatures because of the higher enthalpy gradient. That is to say, increased refrigeration is available at more demanding parameters thus obviating the need for recirculating purified air and adding it to the polluted air.

Pressure is preferably selected between 3 and 10 bar depending upon an analysis of the organic pollutants. The temperature will be in the range of $-30$ and $-100$ ° C. at the pressure side of the turbine, and near the termination of the expansion it will range between $-80$ and $-160$ ° C., depending upon the kind of organic components and their boiling points, contained in the air or technical gas.

Among the energetic advantages derived from the method in accordance with the invention are that no clean or pure air need be added to the polluted air or gas, so that the quantity of air or gas requiring compression can be kept at a minimum. At the same time, low boiling point components may be separated by higher pressure and by a cold scrubber provided with a removal feature. By raising the concentration of spray in the range of moderate refrigeration parameters, the movement of ice crystals forming in the volume of nonfreezing refrigerant is improved, thereby counteracting any clogging hazard.

By degassing the refrigerant flows, the method may, with a relatively low capital outlay, be practiced with very light organic components.

BRIEF DESCRIPTION OF THE SEVERAL DRAWING

The novel features which are considered to be characteristic of the invention are set forth with particularity in the appended claims. The invention itself, however, in respect of its operating steps and the sequence thereof, and the structure, construction and lay-out as well as manufacturing techniques involved in apparatus for practicing the method, together with other objects and advantages thereof, will be best understood from the following description of preferred embodiments when read in connection with the appended drawings, in which:

FIG. 1 schematically depicts equipment suitable for practicing the method in accordance with the invention with gaseous media containing organic components free of large proportions of low boiling point components;

FIG. 2 schematically depicts equipment similar to that shown in FIG. 1 but modified for use with gaseous media containing organic components having large quantitative proportions of low boiling point components;

FIG. 3 schematically depicts an alternative embodiment of the invention in which a separator and a surface heat exchanger providing for an indirect heat exchange are substituted for a prescrubber, and in which the refrigerant in the upper column is degassed;

FIG. 4 schematically depicts a modified method in accordance with the invention in which the entire circulating refrigerant is degassed and in which the refrigerant in the upper column of a cold scrubber may be adjusted by a cold storage to compensate for strongly varying refrigeration demands; and FIG. 5 schematically depicts a modification of the method in accordance with the invention for small outputs or short operating times, in which refrigeration is provided by evaporating liquefied nitrogen.

DETAILED DESCRIPTION OF THE SEVERAL EMBODIMENTS

Figure 1:
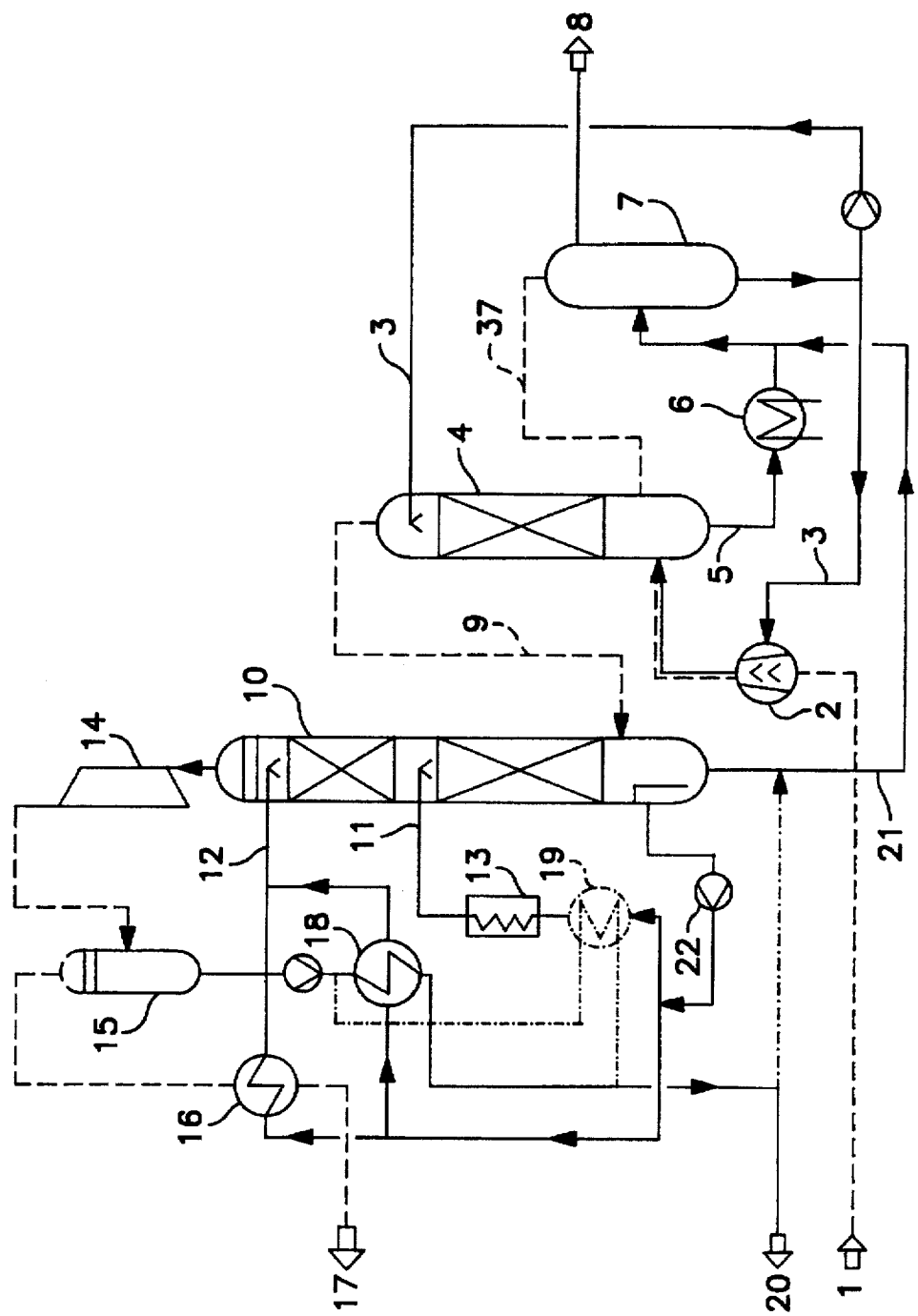

Air 1, hereinafter sometimes called "gaseous medium" polluted by organic vapors is compressed in a compressor 2, such as, for example, a screw compressor provided with liquid, preferably water injection, and is aftercooled by a coolant 3 in a prescrubber 4. Preferably, compression takes place isothermally. Any precipitated bottom product 5 containing proportions of the organic components from the air is subjected to cooling in a cooler 6, and organic components, such as, for instance, gasoline, are separated from the coolant 3 in a separator 7, and are discharged as a valuable product 8. For the described use, the coolant 3 is recirculated for injection into the compressor 2 and, for aftercooling, to the prescrubber 4. Further processing operations depend upon an analysis of the pollutants in the gaseous medium and upon the capacity of the equipment.

As shown in FIG. 1, for organic vapors containing small amounts of low boiling point components, the precooled flow of air 9 is cold scrubbed in a cold scrubber 10 with its own precooled condensate withdrawn as a refrigerant 11 from the bottom of the cold scrubber 10. The refrigerant flow 11 is adequate at moderate refrigeration parameters to provide the refrigeration needed in the lower column and is cooled by an extraneous source of refrigeration 13, such as, for instance, a cold vapor refrigeration unit. At high pollution levels the major portion of organic vapors, including water vapor, is condensed in the lower column 10.

The refrigerant 12 supplies the necessary refrigeration for the upper column of the cold scrubber 10, where any remaining pollution and low boiling point components are separated and continues as further refrigerant flow 11 to the lower column of the cold scrubber 10. The refrigeration required by the upper column of the cold scrubber 10 is supplied by cold air resulting from the expansion of purified compressed air in an expansion turbine 14 providing high refrigeration parameters below −100° C. From the expansion turbine 14, the cold air is directed, by way of a separator 15, to a heat exchanger 16 where the refrigerant 12 is cooled and the purified air 17 is preheated to ambient temperature.

The pressure of any light condensates which may appear in the separator 15 is raised, and their low temperature content is utilized in a heat exchanger 18 or a heat exchanger 19 for cooling or precooling of refrigerant flows. This can also be accomplished, however, by circuits designed differently from the one shown. The condensates occurring in the separator 15 are low boiling point light products 20 which may either be recovered separately, or they may be added to the main flow 21 of the separated condensates including water. The water-free refrigerant flows 11 and 12 are circulated by a circulation pump 22. The excess quantity of the main flow 21 of recoverable valuable substances, including water, is fed to the separator 7, and the organic product 8 is recovered after removal of water. The water is returned to the system, excess water is otherwise disposed of.

Figure 2:
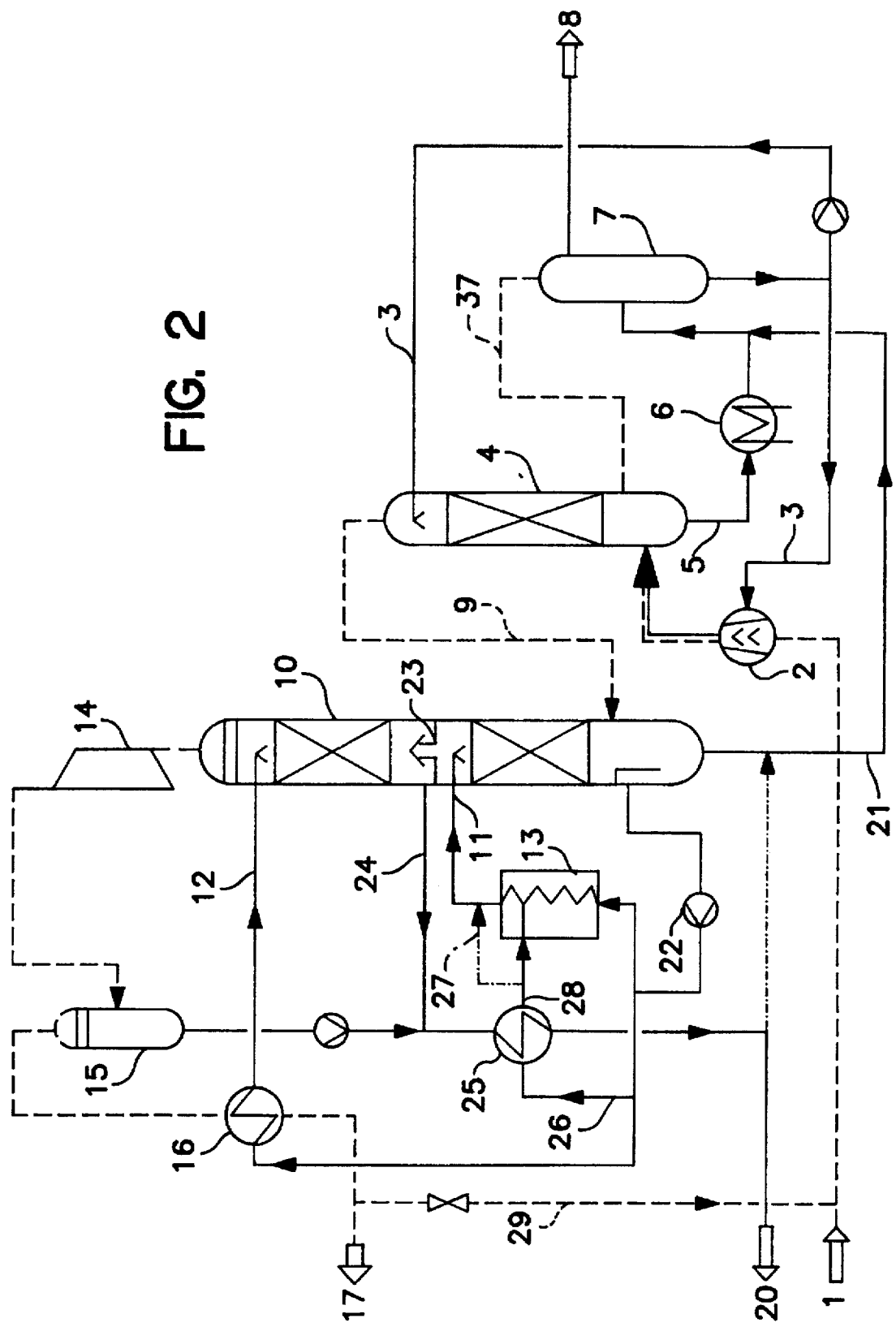

As shown in FIG. 2, organic air pollutants having a high content of low boiling point components can be recovered, and the polluted air can be purified, by cold removal of the light products as a discharge 24 from a discharge bottom 23 below the upper column of the cold scrubber 10. After passing their low temperature content in a heat exchanger 25 to a refrigerant flow 26 needing to be cooled, these organic constituents may be either collected as a separate product, or they may be added to the flow of organic products separated in the prescrubber 4, have their water removed in the separator 7 and thereafter be discharged. The regeneratively preheated refrigerant flow 28 is either added as a refrigerant flow 27 to the refrigerant 11 downstream of the extraneous refrigeration source 13, or it is fed into the cold end of the extraneous refrigeration source 13 as a partial current of the refrigerant flow 28 and requiring aftercooling. The pressure of the small quantities of light condensates separated in the separator 15 in the embodiment of FIG. 2 is also raised, and their low temperature content is utilized. In the simplest case, they may be added to the discharge product 24, the low temperature content of which is utilized in the heat exchanger 25, as described supra. As shown, a portion 29 of the purified air 17 may be circulated to the air intake 1. Other circuit arrangements are possible.

Figure 3:
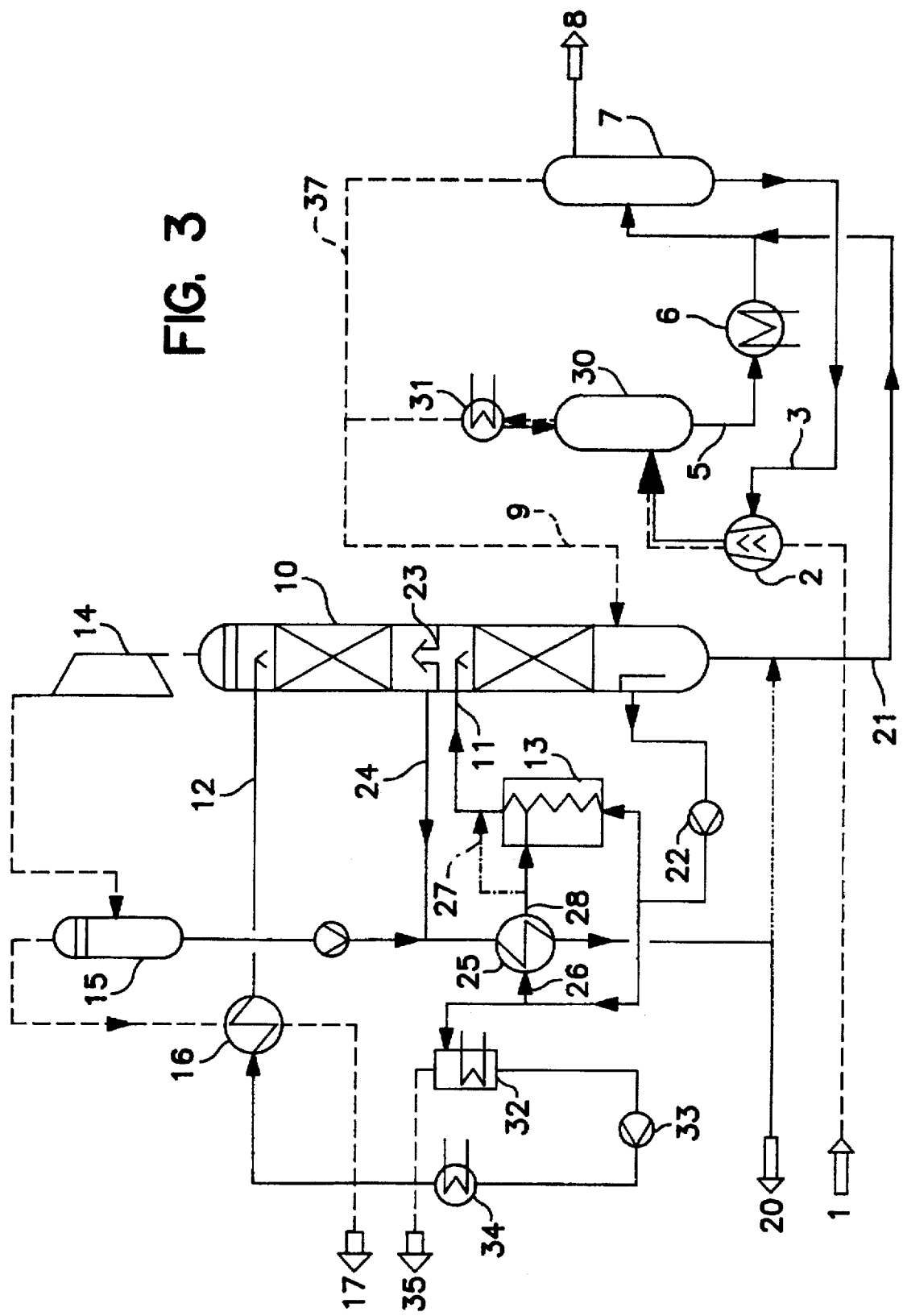

FIG. 3 depicts a special embodiment of the method in accordance with the invention. In this instance, the prescrubber 4 of the previously described embodiments is replaced by a separator 30 and, downstream from it, a surface cooler 31, and the refrigerant flow 12 to the upper column of the cold scrubber 10 is degassed (35) by expansion and, where required, thermically, in a degasser 32, before being fed to the heat exchanger 16 by way of a pump 33 and a cooler 34.

Figure 4:
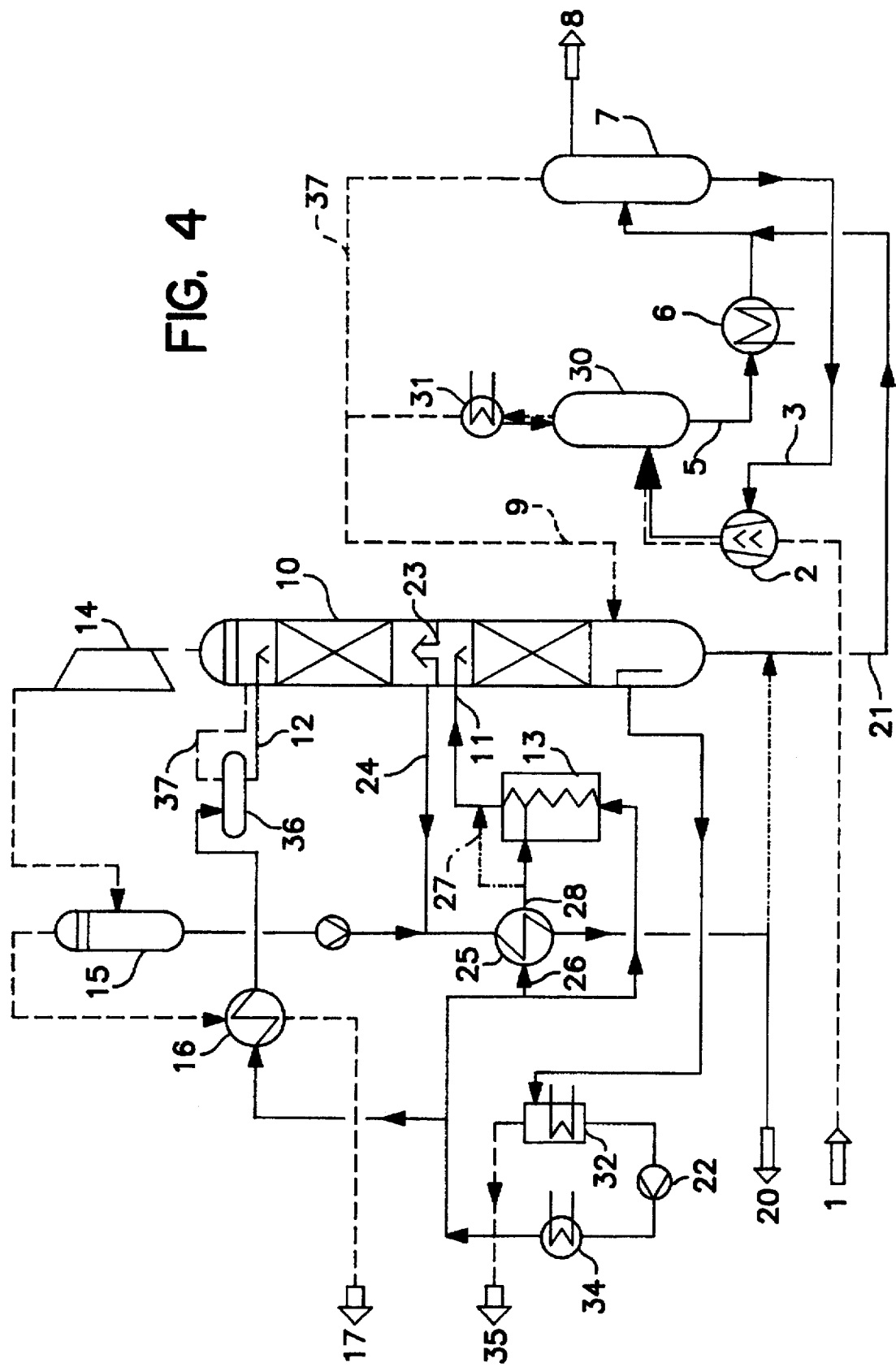

FIG. 4 depicts a further variant which differs from the one of FIG. 3 by the entire partial flow of organic condensates precipitated at the warm end of the cold scrubber 10 being degassed (35) in a degasser 32 by expansion and, where necessary, thermically. This eliminates the need for a pump before degassing. Only after degassing is the pressure of the degassed condensate raised by a circulation pump 22. Thereafter, it is cooled in the cooler 34 and three further sources of refrigeration (extraneous source 13, heat exchangers 25 and 16). Where necessary, the refrigerant 12 for the upper column is stored in a cold storage 36 to be available by appropriate conduits 37 for peak demands.

Figure 5:
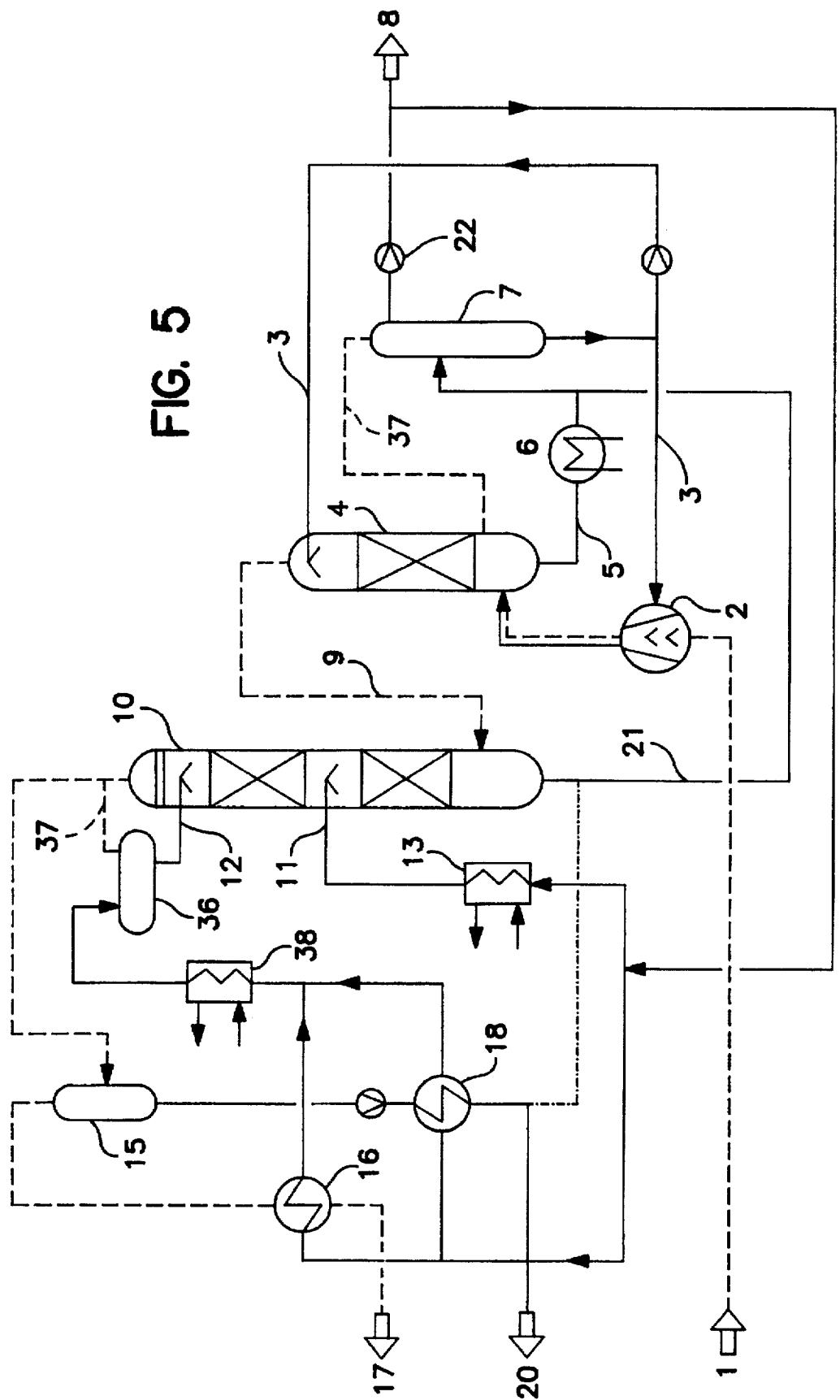

FIG. 5 depicts an embodiment of the method in accordance with the invention for small outputs, i.e. for small quantities of polluted air or technical gases, or for shorter operating times of the equipment. In this embodiment, the refrigeration supplied by the air or gas expansion turbine 14 of the previously described embodiments may be supplied by a liquefied nitrogen evaporator 38. This results in reduced basic costs. Such a technological approach would be particularly advantageous where pressurized purified air is wanted and where expanding it is, therefore, not desired.

What is claimed is:

1. A method of separating organic vapors from gaseous media, comprising the steps of:

subjecting said gaseous media to pressure and to precooling by a first refrigerant to derive precooled gaseous media and a first condensate, including said first refrigerant;

scrubbing said precooled gaseous media in a two-stage cold scrubber to reduce the temperature of said gaseous media by first and second flows of a second refrigerant to a temperature sufficiently low to separate from said scrubbed gaseous media a second condensate of said organic vapors including said second refrigerant, whereby at first refrigeration parameters one of said first and second flows of said second refrigerant provides refrigeration derived from an extraneous source of refrigeration, and at second refrigeration parameters the other of said first and second flows of said second refrigerant provides refrigeration derived from a first heat exchanger;

separating from said scrubbed gaseous media residual organic vapors as a third condensate;

feeding said scrubbed gaseous media through said first heat exchanger and feeding said third condensate through a second heat exchanger provided in the flow of said other refrigerant flow;

removing water from said first, second and third condensates; and collecting said first, second and third condensates as water-free valuable substances.

2. The method of claim 1, wherein said pressure is provided substantially isothermally by a compressor comprising water injection.

3. The method of claim 2, wherein said first refrigerant is by water.

4. The method of claim 1, wherein refrigeration of said other of said first and second flows of second refrigerant is provided by cold air derived from gaseous media in separation means connected to an expansion turbine connected to said cold scrubber.

5. The method of claim 1, wherein said cold scrubber includes a bottom and wherein said second condensate comprising light components of said organic vapors is removed from said bottom and is added at least in part to said first and second flows of said second refrigerant for utilizing the cold temperature content of said part of said second condensate in said first and second flows of said second refrigerant.

6. The method of claim 4, wherein said third condensate is derived by said separation means and its low temperature contents is utilized to refrigerate at least said first flow of second refrigerant downstream of said extraneous source of refrigeration.

7. The method pf claim 6, wherein said third condensate is added to said first flow at a cold end of said extraneous source of refrigeration.

8. The method of claim 7, further comprising the step of utilizing said third condensate derived in said separation means after raising the pressure thereof in a heat exchanger for cooling a partial flow of the other of said first and second flows of refrigerant.

9. The method of claim 7, further comprising the step of adding said third condensate to said second condensate thereby to increase the quantity of light component.

10. The method of claim 9, wherein the scrubbing in said cold scrubber results in a bottom product and wherein said third condensate is added to said bottom product.

11. The method of claim 1, wherein the step of precooling is performed in a separator and a surface cooler and wherein at least a portion of said other of said first and second flows of refrigerant prior to cooling in said heat exchanger is subjected to degassification prior to being fed to said heat exchanger.

12. The method of claim 11, wherein said degassification is performed by expansion.

13. The method of claim 11, wherein said degassification is performed thermically.

14. The method of claim 11, wherein said portion is fed to said heat exchanger by a pump.

15. The method of claim 14, further comprising the step of providing a cooler between said pump and said heat exchanger.

16. The method of claim 10, wherein said bottom product is subjected to degassification.

17. The method of claim 16, further comprising the step of distributing said degassed bottom product to at least one of said extraneous source of coldness and said heat exchanger.

18. The method of claim 1, wherein at least a portion of said other of said first and second refrigerant flows is stored in a compensating cold storage.

19. The method of claim 1, wherein said first and second condensate are collected together.

* * * * *